United States Patent [19]

Sugiyama et al.

[11] Patent Number: 4,980,877
[45] Date of Patent: Dec. 25, 1990

[54] OPTICAL RECORDING AND REPRODUCING SYSTEM WITH HIGH TRACK DENSITY AND LOW CROSS-TALK

[75] Inventors: Hisataka Sugiyama, Tokyo; Takeshi Maeda, Kokubunji; Atsushi Saito, Ichikawa, all of Japan

[73] Assignee: Hitachi, Ltd., Tokyo, Japan

[21] Appl. No.: 239,289

[22] Filed: Sep. 1, 1988

[30] Foreign Application Priority Data

Sep. 4, 1987 [JP] Japan ................................. 62-220232

[51] Int. Cl.$^5$ ............................................... G11B 7/00
[52] U.S. Cl. ................................................. 369/44.41
[58] Field of Search ............................. 369/32, 43–47, 369/275, 109, 111, 44.11, 44.41

[56] References Cited

U.S. PATENT DOCUMENTS 4,761,775 8/1988 Murakami ............................ 369/46

Primary Examiner—Robert L. Richardson
Attorney, Agent, or Firm—Antonelli, Terry, Stout & Kraus

[57] ABSTRACT

An optical recording and reproducing system for an optical recording medium on which information pits are disposed in a tracking direction of the optical recording medium along adjacent tracks which are separated from each other by a predetermined gap which is half the diameter of an optical spot radiated onto the optical recording medium for recording and reproducing information using the information pits, thereby providing a high track density. Information on the optical recording medium is reproduced using a low cross-talk method in which an optical detector for detecting a light intensity distribution of the radiated optical spot after impingement on the optical recording medium has a detecting surface divided into first, second, and third detecting areas. The second detecting area is disposed between the first and third detecting areas. The information on the optical recording medium is reproduced using outputs of the first and third detecting areas.

12 Claims, 9 Drawing Sheets

TRACKING DIRECTION

OPTICAL RECORDING AND REPRODUCING SYSTEM WITH HIGH TRACK DENSITY AND LOW CROSS-TALK

BACKGROUND OF THE INVENTION

This invention relates to optical recording and reproducing system using localized characteristics change (real amplitude reflection coefficient, transmissivity change, deflecting direction change) due to radiation of an optical spot.

In a recording and reproducing system for a filing optical disk in accordance with the prior art technique, for example, grooves for tracking are disposed on the disk surface in its radial direction and an optical spot is radiated on or between the grooves so as to record, reproduce or erase the information data formed on or between the grooves. The grooves are used as a tracking guide for tracking of the optical spot. To reduce recording and reproducing noise, the width between the grooves (or track gap) is preferably smaller than the diameter of a recording pit for recording the data on the disk. However, the following two critical problems must be overcome in order to make the track gap in the radial direction of the disk smaller than the spot diameter and thus to accomplish high track density.

The first is the problem of tracking. The so-called "push-pull system" which is known in the art is generally used to read the optical spot diameter in the radial direction. This system utilizes the action of diffraction grating having a groove structure disposed periodically in the radial direction of the optical spot. If the track gap or the groove gap is reduced in order to attain a high density memory capacity, there occurs the problem in that it becomes difficult to detect the position of the optical spot in the radial direction because the spatial frequency (which is expressed by the inverse number of the period P of the groove) in the radial direction of the disk becomes close to the cut-off frequency of a reading optical system (which is expressed by the inverse number of the diameter of the optical spot).

The second problem is the cross-talk that occurs due to the mixture of unnecessary information from adjacent tracks. If the track gap is made smaller than the optical spot diameter, the optical spot covers the adjacent tracks even when the optical spot tracks accurately the center of the target track, and then unnecessary information will mix into the information of the target track or the cross-talk will increase.

As the method of solving the first and second problems described above and attaining the high density in recording and reproducion in the radial direction, there is known a method according to which the tracks on which the recording pits are formed have a periodical rise-and-fall construction in the radial direction as will be later described and the information from the adjacent tracks are cut off or separated optically. In the tracking method in this case, the periodical rise-and-fall construction is used either as the diffraction grating for recording or reproducing the information or as guiding grooves, or to add signal pits for guiding.

In Japanese Patent Laid-Open No. 57-105828, the disk has a V-shaped or inverted trapezoidal sectional shape 64 as shown in FIG. 7, an optical beam spot is radiated to the slope 65 of the groove and pits 66 are formed for recording and reproduction. According to this method, the gap of the information recording and reproduction position in the radial direction of the disk can be reduced to about the half of the optical beam spot diameter, but the following problem is yet left unsolved.

In order to produce the master disk having the V-shaped or trapezoidal sectional shape in the radial direction as described above, the prior art technique of this reference cuts mechanically a metal sheet by use of a diamond needle whose tip has either the V- or trapezoidal shape. To finish the surface of the groove slope, on which the recording pits are to be formed, to a high quality mirror surface, however, a cutting system which is employed ordinarily and features in a miniature structure or a system which forms the grooves by exposing a laser beam to a photoresist and makes development must be employed. However, it is difficult to produce the master disk described above by ordinary laser cutting.

SUMMARY OF THE INVENTION

It is a main object of the present invention to obtain a low cross-talk recording and reproducing apparatus which can reduce the influences of cross-talk without using complicated cutting technique, can reduce track gaps to about the half of an optical spot diameter and attain high density, and can make stable tracking control.

To accomplish the object described above, the present invention uses an optical recording medium which makes recording by utilizing localized characteristic change (e.g. the change of real amplitude reflection coefficient) due to the radiation of the optical spot and which makes reproduction of the information by the existence of information pits on the disk surface, or by receiving part of the optical intensity distribution by the interference of the diffraction light distribution due to the localized characteristic change due to the radiation of the optical spot.

Furthermore, the present invention detects sample-wise tracking error signals from pre-pit lines disposed with a predetermined gap in the tracking direction of the recording medium disk so as to make tracking control of recording/reproduction of the information.

BRIEF DESCRIPTION OF THE DRAWINGS

FIGS. 1a to 1c show one embodiment of the optical recording and reproducing method of the present invention, wherein FIG. 1a shows the state of a disk, FIG. 1b shows relative modulation with respect to an optical spot position, and FIG. 1c shows reflection intensity distribution on an optical detector;

FIGS. 2a to 2d show a method of cutting a master disk, wherein FIG. 2a shows a master disk cutting apparatus, and FIGS. 2b to 2d show a cutting method;

FIGS. 3a to 3c are explanatory views showing a tracking method by a pre-pit pattern and a pattern recognition method used in the present invention, wherein FIG. 3a shows an example of the pre-pit pattern, FIG. 3b shows the change of returning light power with respect to the pre-bit pattern and FIG. 3c shows a data recognition method;

FIGS. 5a and 5b are block diagrams showing information recording and reproducing means of the present invention, wherein FIG. 5a shows a recording and reproducing method of information pits and FIG. 5b shows a reproducing, method of a header signal;

FIGS. 8a and 8b are explanatory views of means for recording and reproducing continuously the disk of the present invention, wherein FIG. 8a shows a disk having odd-numbered pre-pit patterns and FIG. 8b shows a disk having even-numbered pre-pit patterns; and FIGS. 9a and 9b show another example of the pre-pit pattern used in the present invention, wherein FIG. 9a shows the pre-pit pattern and FIG. 9b shows a disk having the pre-pit pattern.

DESCRIPTION OF THE PREFERRED EMBODIMENT

Hereinafter, a preferred embodiment of the present invention will be described with reference to the accompanying drawings.

Figure 1A:
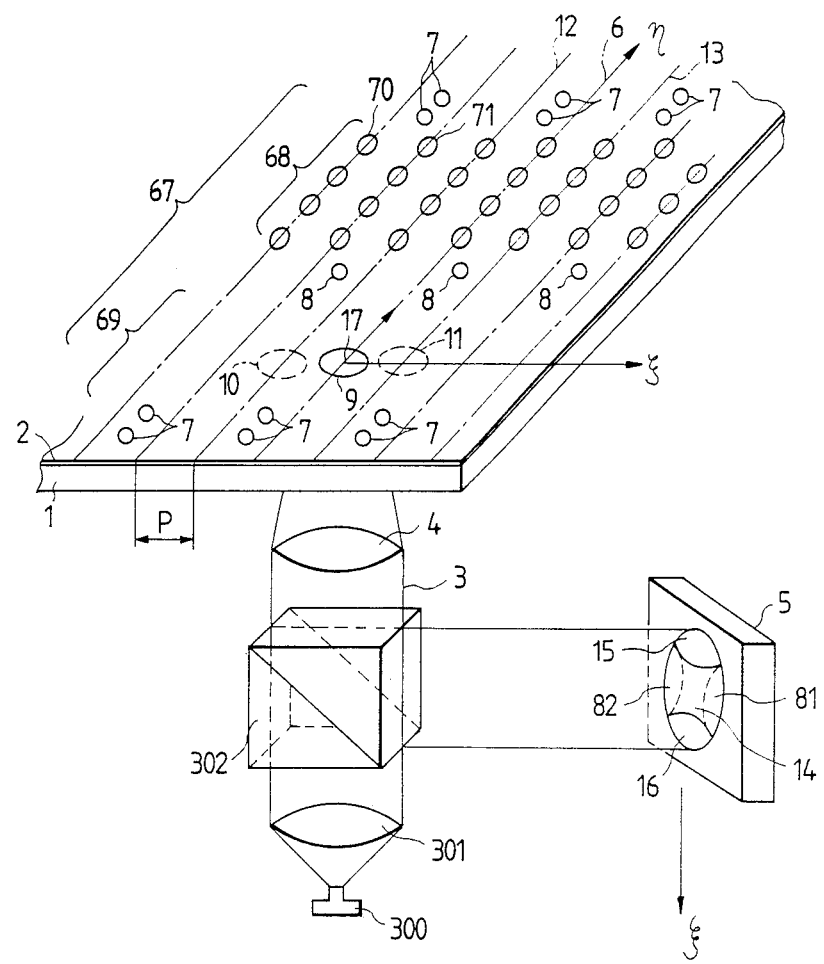

In the disk shown in FIG. 1a, an ablative film 2 for recording and reproducing information by the localized characteristic change due to the radiation of an optical spot is deposited by vacuum deposition or the like on a substrate 1 which is transparent to the wavelength $\lambda$ of an optical source 300 for the optical spot to be radiated on grooves of the disk. As a known optical system, an optical beam 3 of the afocal beam of Gaussian distribution from the optical source 300 is radiated from the disk substrate 1 through a condensing lens 4, is condensed on the recording film 2 and forms an optical beam having a definite diameter due to a diffraction limit. The optical beam diffracted and reflected by corrugations on the disk surface of the real amplitude reflection coefficient passes again through the lens 4 and a half prism 302 and then reaches a far-field plane, that is, an optical detector 5 disposed on an exit pupil plane, where reflection intensity is detected.

On the disk surface, the tracks for recording and reproducing the information are allotted spirally with a gap P in the disk radial direction $\xi$ along a disk circumferential direction $\eta$. In the drawing, the center of the track is represented by one-dot-chain line 6. The tracks around one circumference of the disk are divided into areas referred to as "sectors" for information management. One sector 67 can be broadly classified into a header portion 68 which is in turn composed of pre-pits 70 or 71 formed in advance on the disk and a data portion 69 for recording and reproducing the information by users. Generally, the header portion 68 contains an address providing the position of each sector on the disk as the information. The pre-pits 70 and 71 constituting the header portion 68 consist of phase pits having mutually different depths $\lambda/8$ and $\lambda/4$ and are arranged so that the track of the line of the pre-pits 70 is adjacent to the track of the line of the pre-pits 71.

The data portion 69 consists of a pit line of information pits whose localized real amplitude reflection coefficient is decreased by recording. On the other hand, each pre-pit pair 7 and each pre-pit 8 are alternately disposed at the positions spaced apart by the distance P/2 in the direction $-\xi$ and in the direction $+\xi$ along the center 6 of the track.

Figure 8A:
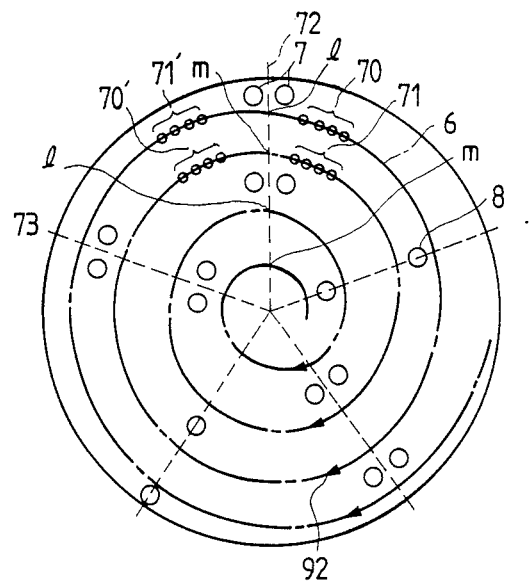
Figure 8B:
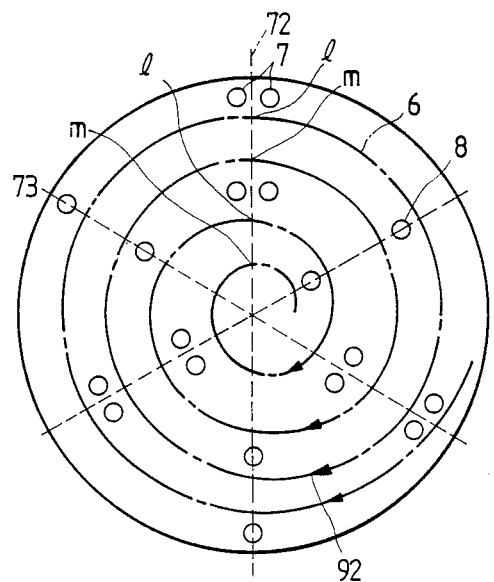

As shown in FIGS. 8a or 8b, the pre-pit lines described above are arranged in the disk radial direction in such a manner as to divide the center angle of the disk into a plurality of areas at an equal angle. Furthermore, the pre-pits described above are arranged with the gap 2P in the radial direction of the disk. The phase pits having a depth $\lambda/4$ are used as these pre-pits. Since FIGS. 8a or 8b shows a miniature structure inside the disk plane with exaggeration, the number of pits and the number of tracks are by far smaller than their actual numbers, respectively. When the disk is produced, it is the pre-pits 70, 71 of the header portion 68 and the pre-pits pairs 7 and pre-pits 8 that are formed in advance.

Figure 2A:
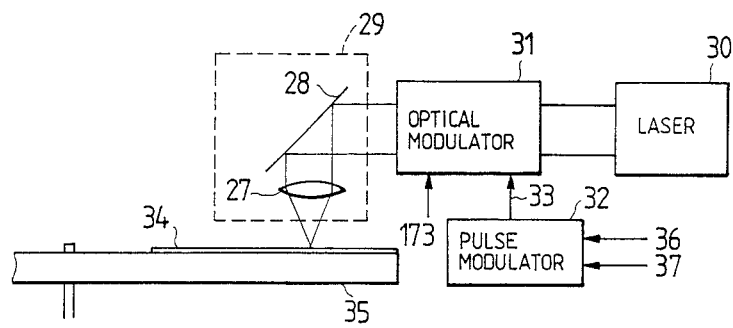
Figure 2B:
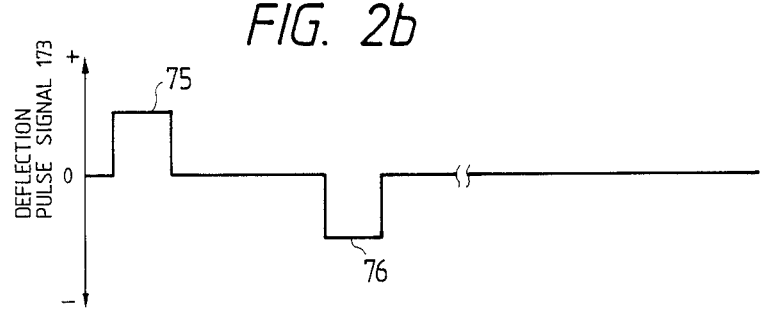
Figure 2C:
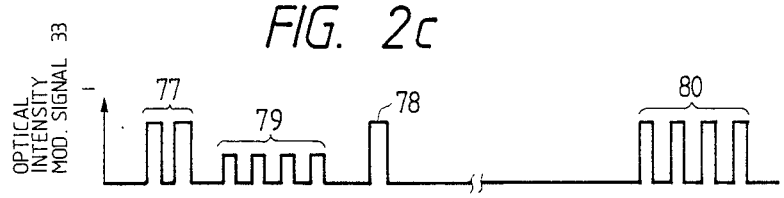
Figure 2D:
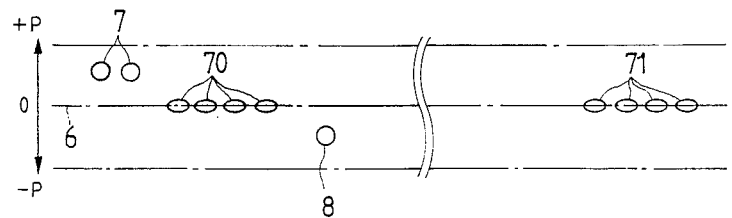

Next, the method of making a master disk in this embodiment will be described. FIG. 2a depicts schematically the outline of a laser cutting apparatus which cuts a master glass disk 35 coated with a photoresist 34 by laser exposure by a laser 30. A moving optical system 29 consisting of a lens 27 for condensing an optical beam onto the master disk 35 that rotates at a predetermined number of revolution per minute and a mirror 28 for guiding parallel optical beams to the lens 27 can be moved mechanically with a high level of accuracy in the disk radial direction. This movement is controlled to an equal speed so that the optical system 29 moves by a distance P per revolution of the disk. The parallel beams from the laser 30 are incident to the moving optical system 29 through an optical modulator 31. The optical modulator 31 has the function of deflecting very slightly the parallel beams in the disk radial direction by a deflection pulse signal 173 and the function of modulating the intensity of the optical beams by an optical modulation signal 33 from the pulse modulator 32.

Here, the method of exposing the pre-pit lines that should be formed in advance at the time of production of the disk will be described with reference to FIGS. 2a to 2d. Positive and negative pulses 75 and 76 per two revolution of the disk are generated alternately and periodically as the deflection pulse signals 173 for a zone corresponding to one round of the disk and the optical spot on the disk 35 is deviated by $+P/2$ or $-P/2$ in the disk radial direction. Furthermore, an optical modulation pulse 77 or 78 is provided during the positive pulses 75 or negative pulses 76 so as to form the pre-pit pairs 7 and the pre-pits 8 at the desired target positions as shown in FIGS. 8a and 8b. At the same time, in order to form the pre-pits 70 or 71 of the header portion 68 (see FIG. 1a), the optical modulation pulse 79 or 80 from the pulse modulator 32 are provided in the zone where neither the pulse 75 nor 76 of the deflection pulse signal 73 exist. Here, the optical modulation pulses 79 having a small amplitude and the optical modulation pulses 80 having a large amplitude are alternately provided per revolution of the disk so that the header portion consisting of the pre-pits 70 having a depth $\lambda/8$ and the header portion consisting of the pre-pits 71 having a depth $\lambda/4$ can be formed alternately per round of the track.

Incidentally, this embodiment uses, as the inputs to the pulse modulator, a digital signal 36 providing a pulse train 33 of the optical modulation signals and a signal 37 which controls the depth of the phase pit and the amplitude of the optical modulation signal depending on the kind of the phase pits to be formed and the recording radial positions in order to form the phase pits having a predetermined depth around the inner and outer peripheries of the disk.

According to the production method described above, the disk having the structure shown in FIG. 8a or 8b can be obtained.

Figure 1B:
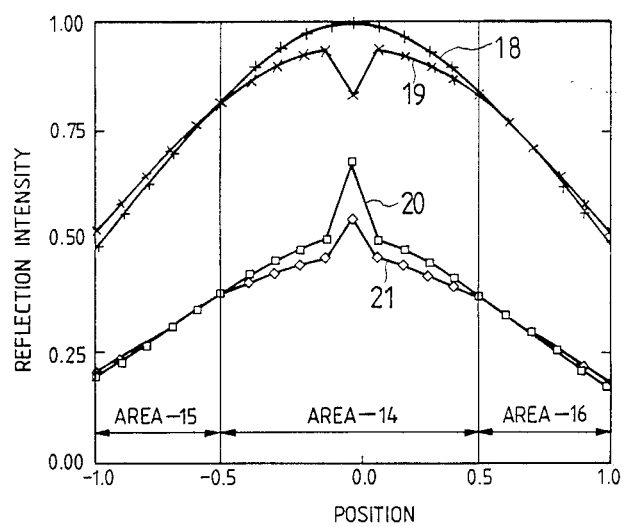

Next, the effect of this embodiment will be explained definitely by providing numeric values to the respective parameters used in the embodiment. If the wavelength of the optical source is $\lambda = 0.83$ $\mu$m and the numeric aperture of the condensing lens 4 is NA=0.5, the spot diameter W of the optical beam on the disk surface is $\lambda/NA \simeq 1.6$ $\mu$m. The track gap P is set to $\frac{1}{2}$ of the optical spot diameter, that is, 0.8 $\mu$m. First of all, the effect of the low cross-talk detection method of the data portion 69 will be described, though the tracking control method is described later. Let's consider, for example, the case where the track for reproducing the information is the target track 6, there is the information pit 9 of a diameter 0.6 $\mu$m whose real amplitude reflection coefficient is decreased in the recording process and the information pits 10 and 11 are disposed in the adjacent tracks 12 and 13 in the disk radial direction $\xi$, respectively. In this case, the period of the change of the real amplitude reflection coefficient is $P=\lambda/2NA$ in the disk radial direction. Here, the intensity distribution of the reflected beam formed on the far-field plane or the optical detector 5 due to the interference of the diffracted beam of each order obtained in correspondence to the periodical distribution of the real amplitude reflection coefficient can be divided into three areas 14, 15, 16 represented by solid lines on the optical detector depending on the interference area. Calculation based on the diffraction theory (J. Opt. Soc. Am., Vol. 69, No. 1, p. 4) is hereby made in the disk radial direction $\xi$ on the optical detector 5 to obtain the intensity distribution of the reflected beam, which is shown in FIG. 1b. In the diagram, curve represents the positions on the optical detector when the radius of the optical detector 5 is normalized by "1" on the abscissa and the ordinate represents the peak value which is normalized by "1" of the reflection intensity distribution obtained when the information pits do not exist. The reflection intensity distribution will be shown about the following cases (1) to (4) when the optical spot exists at the position 17 in FIG. 1a:

(1) when the information pits 9, 10, 11 do not exist (curve 18)
(2) when only the information pits 10, 11 exist (curve 19)
(3) when only the information pit 9 exists (when the pits 10, 11 do not exist at the adjacent tracks; curve 20)
(4) when the information pits 9, 10, 11 exist (curve 21)

The influences of the cross-talk from both adjacent pits 10, 11, when no information pit 9 exists in the target track 6, can be appreciated by comparing (1) with (2) and the influences of the cross-talk from the pits 10, 11 when the information pit 9 exists in the target track 9, can be appreciated by comparing (3) with (4). It can be understood further as the result of comparison that the influences of cross-talk are remarkable in the area 14 but hardly exist in the areas 15 and 16. Therefore, it can be understood that in order to obtain the information reproduction signal, the influences of cross-talk can be reduced by detecting the sum of the returning light power on the light receiving planes 15 and 16.

Figure 1C:
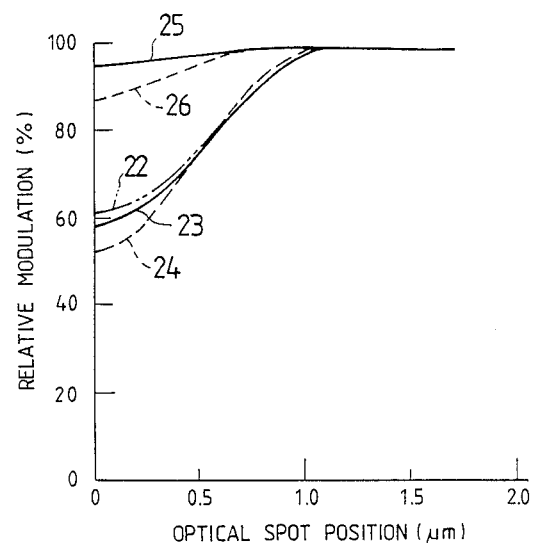
Figure 5A:
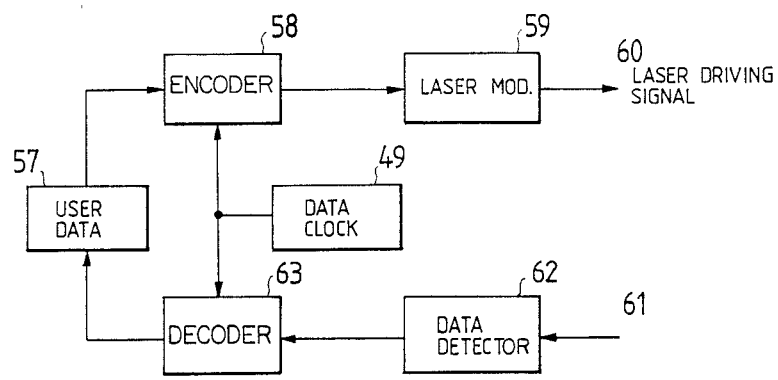

Next, the actually measured data are shown in FIG. 1c. In the drawing, abscissa represents the optical spot position in the tracking direction ($\eta$ direction) with respect to the origin 17 and the ordinate represents relative modulation which is normalized by setting the returning light power in the case of (1) to 100% about a total detecting method of returning light power which detects the returning light power on the light receiving planes 14, 15, 16 and a partial detecting method of returning light power in the present invention which detects the returning light power on the light receiving planes 15 and 16. In this case, the information pit diameter is 0.6 $\mu$m. In the case of (3) described above, that is, where no pits exist on the adjacent tracks, both detecting methods exhibit the same relative modulation characteristics 22 but when the pits exist on both adjacent tracks, the influences of cross-talk are obviously smaller in accordance with the partial detecting method 23 than the total detecting method 24 of the returning light power. Similarly, in the case of (2) where no information pit exists, the partial detecting method 25 can reduce more greatly the influences of cross-talk than the total detecting method 26. It can be seen from FIG. 1c that the cross-talk noise is about $-20$ dB, the absolute returning light power is $\frac{1}{2}$ of the total detecting method and the information having sufficient reliability can be reproduced. Recording and reproduction of the data portion 69, inclusive of the low cross-talk detecting method of the data portion 69, will be explained with reference to the block diagram of FIG. 5a.

When user data 57 are recorded on the disk, the data are converted to coded data by an encoding circuit 58. Data clocks 49 necessary for encoding are generated from the pre-pit pairs 7 (see FIG. 1a) and the lines of pre-pits 8 that are formed on the disk as described already. The encoded data pass through a laser modulation circuit 59, are converted to laser driving signals 60 for driving the laser as a light source, modulate the emission intensity of the laser and record the information pits on the disk. When the user data recorded on the disk are reproduced, the sum of the returning light power on the light receiving planes 15 and 16 on the optical detector 5 shown in FIG. 1a, or the information from the information pits on the disk or the pit positions or the edge positions of the pits are detected from partial returning light power detecting signals 61 through a data detecting circuit 62 and are converted to digital signals. Next, the resulting digital signals are decoded by a decoding circuit 63 at the timings designated by the data clocks 49 to reproduce the user data 57.

The embodiment described above represents the effect of detecting low cross-talk about the ablative recording medium whose localized characteristic change is the change of the real amplitude reflection coefficient as the information pits. However, the embodiment can be applied to a phase change type recording medium whose real amplitude reflection coefficient likewise changes, as other recording media. The effect described above can be obtained from an opto-magnetic recording film whose deflecting direction changes locally, by use of means for receiving only one deflecting direction component.

Next, the low cross-talk detecting method of the header portion 68 will be explained. As described in Japanese Patent Laid-Open No. 54-136303, in accordance with the low cross-talk detecting method, the header portions of the pre-pits 70 and 71 having the depth $\lambda/8$ and $\lambda/4$ are disposed alternately and an optical detector 5 is disposed in such a manner that the light receiving planes 81, 82 face in the tracking direction as represented by dotted line in FIG. 1a. Here, the difference of the returning light power is detected between the two light receiving planes 81 and 82 to reproduce the header portion of the pre-pits 70 having the depth $\lambda/8$ and their sum is detected to reproduce the header portion of the pre-pits 71 having the depth $\lambda/4$. In this manner, the header information on the target track can be detected without being affected by the cross-talk from the adjacent tracks.

Figure 5B:
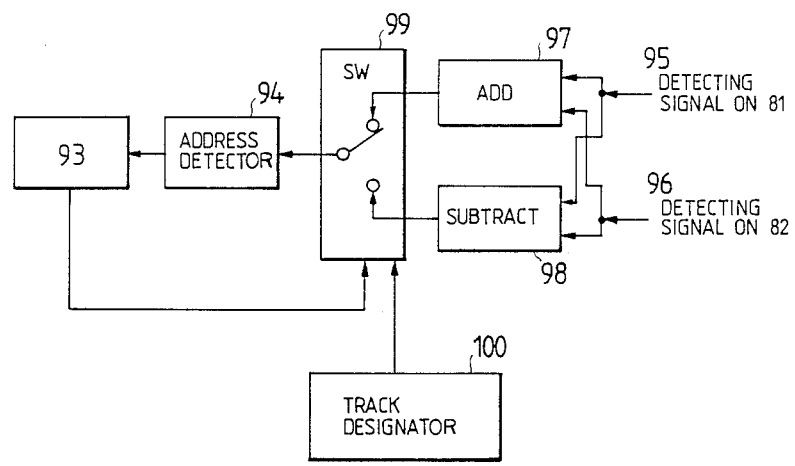

FIG. 5b is a block circuit diagram of the circuit for detecting the header information described above. Assuming that the header portions of the even-numbered tracks l are formed by the pre-pits of λ/8 and the header portions of the odd-numbered tracks m on the disk are formed by the pre-pits 71 of λ/4, the detecting signal 95 on the light receiving plane 81 and the detecting signal 96 on the light receiving plane 82 are input to an addition circuit 97 and a subtraction circuit 98. A change-over switch 99 selects the added value and the subtracted value. The even- and odd-numbered tracks are instructed by a track designation controller 100 to this switch 99. The addition value is selected when the odd-numbered track is designated and the subtraction value is selected when the even-numbered track is designated. The output of the switch 99 is inputted to an address detecting circuit 94, which detects the track position and sector position on the disk that are reproduced at that time. The address of each position is also outputted from this detecting circuit.

The address output is led to a timing generation circuit 93 (one-pulse-signal-per-one-rotation generating circuit) which consists of counters or the like and generates a timing signal per rotation of the disk, and this circuit 93 generates the timing of the shift from the odd-numbered track to the even-numbered track and vice versa. This timing signal is applied to the change-over switch 99 in order to detect always the header information having the low cross-talk.

Next, the tracking control method will be described. As described already, the present invention cannot use the push-pull system which requires the equidistant groove structure and is the conventional tracking control method. Therefore, as the heretofore known sample servo system or the servo system disclosed in Japanese Patent Publication No. 58-021336, tracking control is made by detecting sample-wise the tracking error signals from the pre-pit lines disposed in the divided areas on the circumference of the disk or disposed with predetermined gaps on the circumference, and the information pits are recorded in the areas where the pre-pits do not exist, thereby eliminating any adverse influences on the low cross-talk detecting method of the present invention. In this embodiment, the description will be given by use of the servo system described in Japanese Patent Publication No. 58-021336.

Figure 3A:
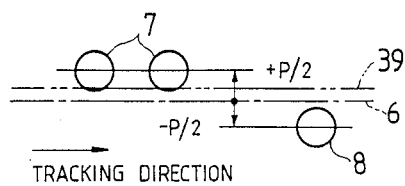
Figure 3B:
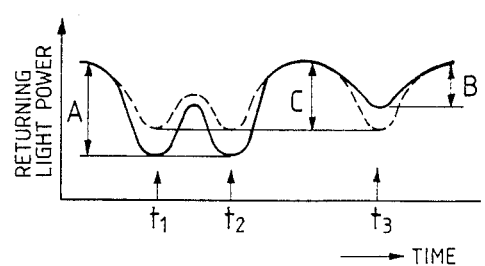
Figure 4:
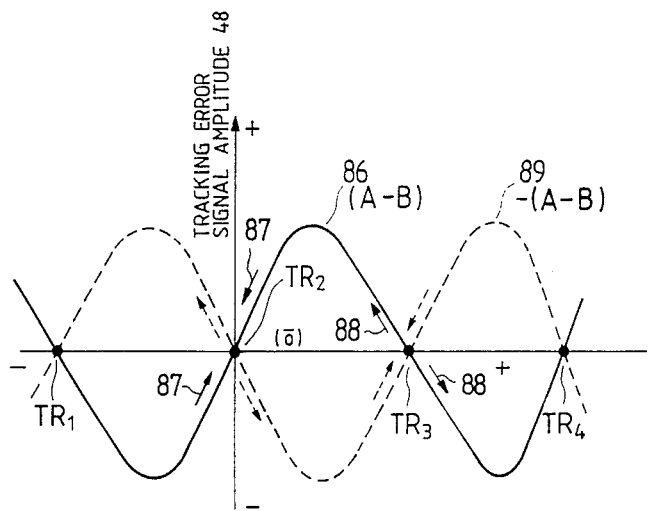
FIG. 4 shows a tracking error signal by the pre-pit pattern.
Figure 7:
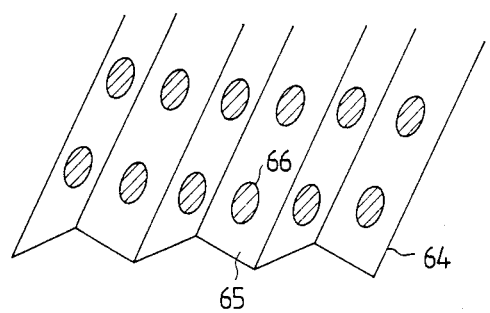
FIG. 7 shows the principal portions of a conventional disk.

The principle of obtaining the tracking error signal from the pit lines of the pre-pit pairs 7 and pre-pits 8 will be described. As shown in FIG. 3a, the pre-pit pair 7 exists at the position spaced apart by +P/2 from the target track 6 and the pre-pit 8 exists at the position spaced apart by −P/2. Now, the total returning light power in the optical detector 5, that is, the sum of the returning light power on the light receiving planes 14, 15, 16 (see FIG. 1a) when the optical spot tracks the track 6 in the direction represented by arrow. The pits are formed in such a manner that under this state, the change of the returning light power when the optical spot passes through the pre-pit pair 7 or the pre-pit 8 provides the same change C as shown in FIG. 3b. When the optical spot moves on a line 39 which is deviated on the +(plus) side from the track 6 in the arrangement of such pit lines, there are obtained a change A greater than the change C at the timing $t_1$, $t_2$ when it passes by the pits on the +(plus) side, that is, each pit of the pre-pit pair 7 in this case, and a change B smaller than the change C at the timing $t_3$ when it passes the pit on −(minus) side, or the pre-pit 8 in this case as shown by a solid line. The relation between the changes A and B is reversed when the optical spot deviates on the −(minus) side with respect to the track 6 as shown by a dotted line. Incidentally, this relation is the same when the pre-pit 8 exists on the +(plus) side and the pre-pit pair 7, on the −(minus) side. Therefore, if the change values A and B at the timing $t_2$ and $t_3$ are held and their difference A−B is detected, an (A−B) signal 86 represented by solid line can be obtained as the tracking error signal as shown in FIG. 4. Tracking control becomes thus possible by controlling the position of the optical spot by this tracking error signal.

As shown in FIG. 1a, the pre-pit pairs 7 or the pre-pits 8 are spaced apart by the gap 2P, that is, by about the diameter of the optical spot and accordingly, there is no influence of cross-talk between the pre-pit pairs 7 or between the pre-pits 8. However, the polarity of inclination of the tracking error signal inverses depending on whether or not the pit pair 7 is on the left side in the tracking direction as represented by the relation between the even-numbered track l and the odd-numbered track m shown in FIGS. 8a and 8b with respect to the tracks whose gap between the pre-pits 6 and 12 or 6 and 13 shown in FIGS. 1a, for example, is P. Therefore, as shown in FIG. 4, if the optical spot exists near the even-numbered track l shown in FIGS. 8a and 8b with respect to the (A−B) signal 86, the optical spot tracks the even-numbered track TR2 as represented by arrow 87 in FIG. 4 but when the optical spot exists near the odd-numbered track m, however, it does not track the odd-numbered track TR3 represented by arrow 88 but does track the adjacent even-numbered track TR2 or TR4. Accordingly, in order to let the optical spot track the odd-numbered track m, the polarity of the (A−B) signal 86 is inversed and the resulting −(A−B) signal 89 is used as the tracking error signal.

Figure 6:
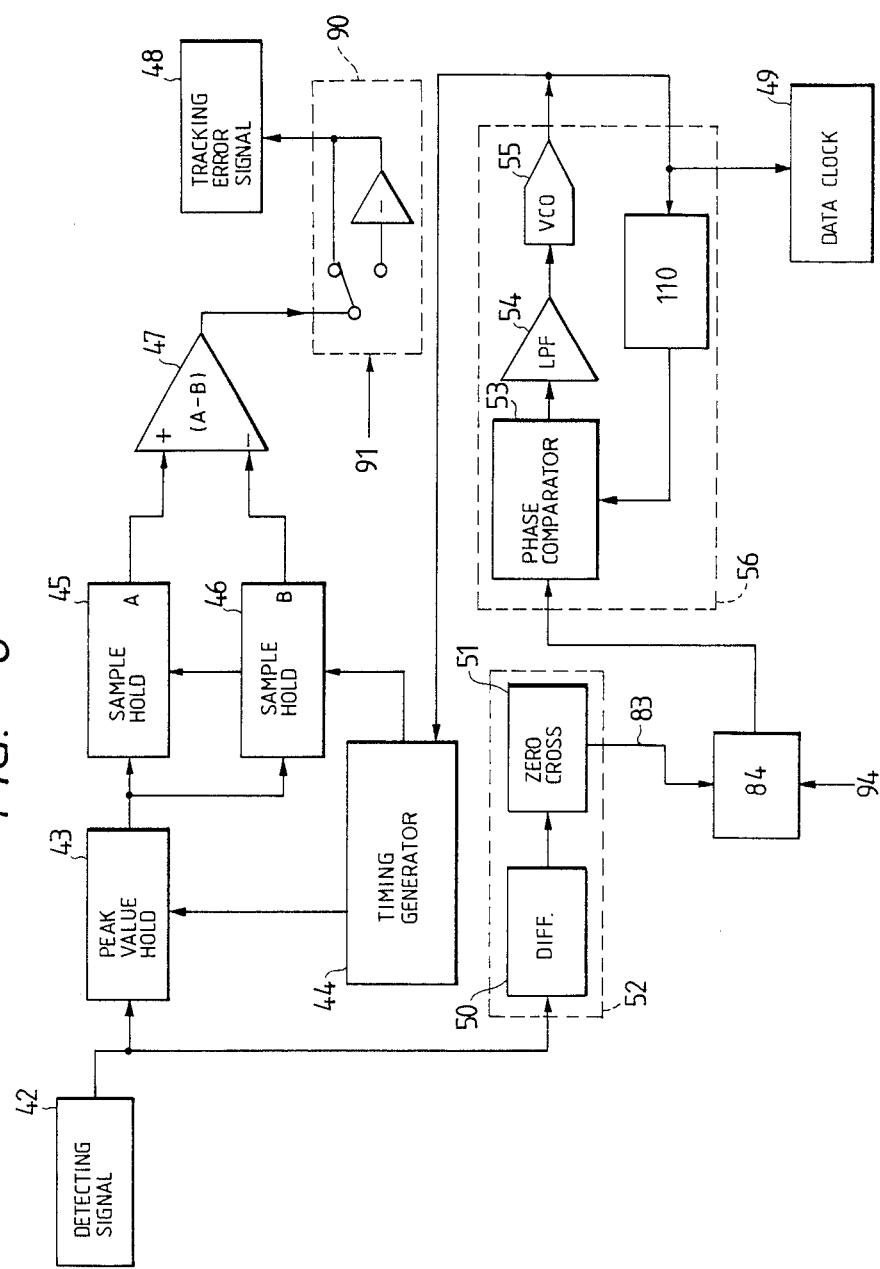
FIG. 6 is a block circuit diagram for detecting the tracking error signal and a data clock by the pre-pit pattern.

FIG. 6 is a block diagram showing the circuit block for obtaining the tracking error signal described above. The total returning light power detecting signal 42 is inputted to a peak value hold circuit 43, a hold instruction is received at the time $t_2$ or $t_3$ from a timing generation circuit 44 and detecting signals at the respective times are held. Next, sample/hold circuits 45, 46 output the hold values at the time $t_1$, $t_2$ respectively at the timing from the timing generation circuit 44. Therefore, the difference of change between the pit on the +(plus) side and the pit on the −(minus) side that are detected alternately in FIG. 3, that is, the (A−B) signal 86 (shown in FIG. 4), is generated to the output of a difference detecting circuit 47. Furthermore, this signal is passed through a tracking polarity inversing circuit 90 so as to obtain the (A−B) signal 86 or the (B−A) signal 89 as the tracking error signal 48 by a polarity inversing instruction 91.

Next, the description will be given on means for detecting data clock 40 (see FIG. 6) which is in synchronism with the timing of the time $t_1$, $t_2$, $t_3$ which are necessary as the input to the timing generating circuit 44. The total returning light power signal 42 is passed through a known peak position detecting circuit 52 consisting of a differentiation circuit 50 and a zero-cross detecting circuit 51, where the total returning light power detecting signal 42 comes to contain not only the signals of the pre-pit pair 7 and the pre-pit 8 but also the signals of the pre-pits 70, 71 of the header portion 68 or the information pits of the data portion 69. Therefore, the signal is passed through a pattern recognition circuit 84 in order to separate only the signals of the pre-pit pair 7 and pre-pit 8 from the peak position detecting signal 83 thus mixed. The pattern recognition circuit 84 has the function of outputting the signal which is synchronized with the timing of the time $t_2$, $t_3$ only when the sequence pattern of the pre-pit pair and pre-pit 8 shown in FIG. 3a, that is, the position relation of the three peaks shown in FIG. 3b, is detected.

Figure 3C:
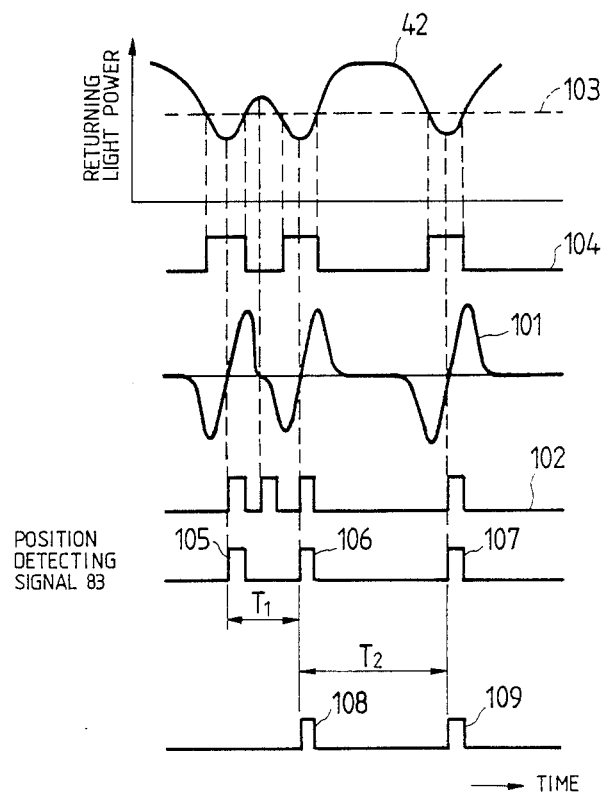

Next, a more definite pattern recognition method will be described with reference to FIG. 3c. The zero-cross detecting signal 102 is determined from a first differentiation signal 101 of the total returning light power detecting signal 42. On the other hand, a slice level 103 is set to the detecting signal 42 of the total returning light power to obtain a gate signal 104. A peak position detecting signal 83 is obtained from the logical product between the zero-cross detecting signal 102 and the gate signal 104. Here, if the tracking deviation occurs as will be described later, the amplitude level of the detecting signal 42 changes so that the gate signal 104 cannot be detected by the slice level 103. Therefore, in order to detect the gate signal 104, the change of the amplitude level of the detecting signal 42 is suppressed by passing it through an automatic gain control circuit (AGC) to detect the gate signal 104.

Another method further differentiates the first differentiation signal 101 to obtain a second differentiation signal and the gate signal 104 can be detected from this signal (not shown).

The length $T_1$ or $T_2$ between the peaks appearing continuously when the position detecting signal 83 thus obtained is passed through a counter circuit is detected. In this case, the peak positions exhibiting the values different from $T_1$ and $T_2$ as the gaps of the peak positions 105, 106 and the peak position 107 corresponding to the pre-pit pair 7 and to the pre-pit 8 are neglected, and the timing pulses 108 and 109 are outputted at the point of time when the peak gaps $T_1$, $T_2$ are detected. In this manner, the timing pulses 108 and 109 which are in synchronism with the timing of the time $t_2$, $t_3$ can be obtained at the output of the pattern recognition circuit 84. As the pattern described above, it is possible to use those patterns which are not contained in the pit line constituting the header portion 68 and the data portion 69 beside the pattern shown in FIG. 3a.

The output of the pattern recognition circuit 84 passes through a phase locked loop 56 consisting of a phase comparator 53, a low-pass filter 54, a voltage-controlled oscillator 55 and a frequency divider 110 and outputs data clocks 49 which are in synchronism with the timings of the time $t_2$ and $t_3$.

As described above, the method of reproducing the information in the header portion 68 and in the data portion 69 without being affected by the influences of cross-talk and the method of tracking control have been explained. Next, recording and reproduction of the information along the tracks disposed actually on the disk by use of the method described above will be explained.

In this embodiment, two disk formats shown in FIGS. 8a and 8b must be taken into consideration. FIG. 8a shows the case where the number of division of the center angle of the disk that determines the arrangement in the disk radial direction, that is, the number of dotted lines in the drawing, is odd-numbered and FIG. 8b shows the case where it is even-numbered. In each of FIGS. 8a and 8b, discontinuity is provided per circumference by the dotted line 72. In FIG. 8a, when the optical spot scans in the direction of arrow 92 along the tracks on the dotted line 72, the pre-pit pairs 7 appear continuously at the time of shift from the position of the dotted line 73 to the position of the dotted line 72, and a desired set of pattern consisting of the pre-pit pair 7 and the pre-pit 8 cannot be detected. In FIG. 8b, on the other hand, the data pattern described above can be detected at the time of shift from the position of the dotted line 73 to the position of the dotted line 72, but the pre-pit pair 7 and the pre-pit 8 that should be alternately detected in the areas on the right and left sides of the track are detected on the same side of the track. The following explanation is given in consideration of the problems of the disk formats shown in FIGS. 8a and 8b.

It will be hereby assumed that the disk is prepared in such a manner that in the areas not having discontinuity, the pre-pits 70 having the depth $\lambda/8$ are used as the header portion 68 of the tracks having the pre-pit pairs 7 on the left side and the pre-pits 8 on the right side of the tracks in the scanning direction of the optical spot, that is, the even-numbered tracks l in the drawing, and the pre-pits 71 having the depth $\lambda/4$ are used as the header portion 68 of the odd-numbered tracks m having the pre-pits 8 on the left side and the pre-pit pairs 7 on the right side of the track. The timing signal generated by the afore-mentioned one-pulse-signal-per-one-rotation generating circuit 93 shown in FIG. 5b is operated by the address detecting circuit 94 of the header portion which makes detection immediately before the position of the dotted line 72. The output signal of the one-pulse-signal-per-one-rotation generating circuit 93 is used as a polarity inversion order 91 of a tracking polarity inversion circuit 91 as first means. The one-pulse-signal-per-one-rotation timing 93 is inputted as a pattern sequence inversion order 94 to the pattern recognition circuit 84 as the second means in order to change over so that the pattern recognition circuit 84 recognizes the sequence in which the pre-pit 8 follows the pre-pit pair 7 or the sequence in which the pre-pit pair 7 follows the pre-pit 8.

The second means described above has eventually the same function as the first means. In other words, under the state where the change quantity of the pre-pit pair 7 positioned on the left side of the track in the tracking direction in FIGS. 5a, 5b and 8a, 8b is held by a sample-and-hold circuit 45 due to the pattern recognition of the sequence in which the pre-pit 8 follows the pre-pit pair 7 and the change quantity of the pre-pit 8 positioned on the right side of the track is held by a sample-and-hold circuit 46, if the sequence of the pattern is recognized reversely, the change quantity of the pre-pit 8 is held by the sample-and-hold circuit 45 while the change quantity of the pre-pit pair 7 is held by the sample-and-hold circuit 46. Therefore, this is equivalent to the effect that the polarity of the tracking error signal 48 is switched by the tracking polarity inversion circuit 90.

Accordingly, it becomes possible to obtain continuous recording and reproduction of information while the optical spot follows the spiral track by changing the change-over switch 99 and the polarity of the tracking polarity inversion circuit 90 or the sequence pattern of the pattern recognition circuit immediately before the optical spot is positioned to the dotted line 72. In order to make continuous recording and reproduction of the same track, an impulse offset in the direction in which the optical spot is compulsively moved to the target track is impressed on the difference detector 47 shown in FIG. 6 by another one-pulse-signal-per-one-rotation generating circuit in the areas where no discontinuity exists or in the areas other than the area of from the dotted line 73 to the dotted line 72, in addition to the switch of the polarity or the like at the one-pulse-signal-per-one-rotation timing described above.

Though FIGS. 8a and 8b show the spiral tracks, the optical spot can be moved to the neighboring track and recording and reproduction of the tracks can be made sequentially for the concentrical tracks, too, by the application of the impulse offset described above by the timing of the one-pulse-signal-per-one-rotation timing.

Figure 9A:
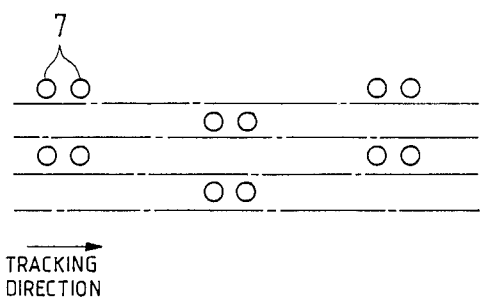
Figure 9B:
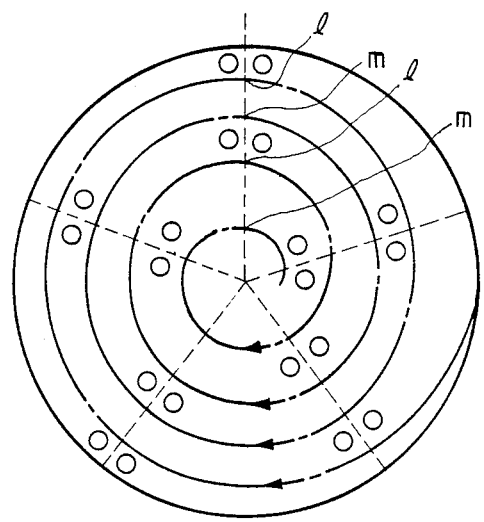

As described above, when the pattern shown in FIG. 3a is used, the polarity of the tracking polarity inversion circuit or the sequence pattern of the pattern recognition circuit must be switched per rotation of the disk as described with reference to FIGS. 8a and 8b. In contrast, when the symmetric pattern in which the pre-pit pairs 7 are alternately disposed in the tracking direction as shown in FIG. 9a, the change-over operation described above becomes unnecessary if the number of areas of dotted lines representing the disposition of the pre-pit pairs 7 is odd-numbered as shown in FIG. 9b because there is no discontinuity. To reproduce the information of the header portion 68, however, the change-over switch 99 must be switched by the even-numbered tracks l and the odd-numbered tracks m as shown in FIG. 5b. In this case, pattern recognition is made by the peak gap of the detecting signals corresponding to the individual pit positions of the pre-pit pairs 7.

Furthermore, a recording/reproduction method which does not require the switch operation described above for reproducing the header information will be described. This method radiates at least two optical spots on the disk and lets the optical spots follow the adjacent tracks. For example, the first optical spot as one of the two optical spots is disposed always on the even-numbered tracks l by use of the disk format shown in FIG. 8a and the second optical spot as the other optical spot is disposed always on the odd-numbered tracks m. The header portion 68 is disposed only on the even-numbered tracks l and the pre-pit 71 having a depth λ/4 is used as the pits forming the header portion. So long as the position relation between these two optical spots remains unchanged, the address at which the second optical spot is positioned can be recognized, too, if the header information is reproduced and the address is recognized by the first optical spot. Therefore, it is not necessary to make low cross-talk detection by the heretofore known means such as the means disclosed in Japanese Patent Laid-Open No. 54-136303 in order to set the gap between the header portions in the disk radial direction to 2P, that is, to dispose them in the spaced-apart relation by the distance substantially equal to the diameter of the optical spot.

Here, parallel recording and reproduction and high speed high density operation can be accomplished by letting the first and second optical spots follow the even- and odd-numbered tracks l and m, respectively, for the disk having the disk format shown in FIG. 8a and receiving the reflection intensity for the respective optical spots by the optical detectors 5 disposed for the respective tracks.

Though the embodiment of the present invention has thus been described by use of the servo system described in Japanese Patent Publication No. 58-21336, the present invention can be accomplished by use of the means described in the embodiment even when the heretofore known sample servo system is employed.

In this embodiment, since encoding and decoding are managed by the data clocks 49 generated from the pre-pit patterns formed on the disk, deviations of recording and reproduction timings do not occur, in principle, due to the change of the disk rotation. Therefore, recording and reproduction can be made with a smaller error. Since any corrugations other than the phase pits and information pits do not exist on the disk, the disk noise is small and information reproduction can be made with a high signal-to-noise ratio (S/N).

As described above, the optical recording and reproduction method in accordance with the presnet invention uses an optical recording medium which makes recording by utilizing the localized characteristic change due to the radiation of an optical spot, arranges uniformly pre-pit lines in the tracking direction of the optical recording medium, makes tracking control for recording and reproduction of the information by use of the pre-pit lines as the guide, receives part of the reflected intensity distribution due to interference of the diffracted light distribution from the recording medium for recording of the information, and can therefore reduce the influences of cross-talk without using a disk formed by complicated cutting technique and make stable tracking control. Accordingly, the present invention provides the effect that high density recording can be accomplished by reducing the track gap to about the half of an optical spot diameter.

What is claimed is:

1. An optical recording and reproducing system for an optical recording medium having lines of pre-pits disposed in a tracking direction of the optical recording medium and wherein an optical spot is radiated onto the optical recording medium to effect recording and reproduction of information using information pits on the optical recording medium formed by localized changes in a characteristic of the optical recording medium, the information being recorded and reproduced using the lines of pre-pits as a guide for tracking control, the system comprising:

means for radiating light as an optical spot onto the optical recording medium;

means for detecting a light intensity distribution of the radiation optical spot after impingement on the optical recording medium and indicative of the localized changes in the characteristic of the optical recording medium, the detecting means including a detector having a detecting surface on which the radiated optical spot after impingement on the optical recording medium is incident, the detecting surface being divided into first, second, and third detecting areas disposed in a direction of the detecting surface corresponding to a direction transverse to the tracking direction of the optical recording medium, the second detecting area being disposed between the first and third detecting areas, at least the first and third detecting areas providing outputs indicative of the light intensity distribution thereon; and reproducing means responsive to the outputs of the first and third detecting areas for providing an output indicative of the information on the optical recording medium.

2. An optical recording and reproducing system according to claim 1, wherein the lines of pre-pits are separated from each other by a predetermined gap, and further comprising:

means for sampling the liens of pre-pits to obtain tracking error signals; and means for performing tracking control in effecting recording and reproduction of information on the optical recording medium in response to the tracking error signals.

3. An optical recording and reproducing apparatus according to claim 1, wherein the first and third detecting areas each have a dimension int he direction of the detecting surface corresponding to the transverse direction of the optical recording medium which is equal to 25% of the dimension of the detecting surface in the direction of the detecting surface corresponding to the transverse direction of the optical recording medium.

4. An optical recording and reproducing system according to any one of claim 1-3, wherein the characteristic of the optical recording medium having localized changes is a real amplitude reflection coefficient of the optical recording medium.

5. An optical recording and reproducing system according to claim 1, wherein the lines of pre-pits are provided with a discrimination pattern, and further comprising:

means for discriminating the pre-pits form the information pits on the basis of the discrimination pattern; and means for performing tracking and timing control in effecting recording and reproduction of information on the optical recording medium in response to the pre-pits discriminated by the discriminating means.

6. An optical recording and reproducing system according to claim 5, wherein the information pits are disposed in the tracing direction of the optical recording medium along a predetermined track, and wherein the lines of pre-pits are provided with the discrimination pattern by alternately and repeatedly disposing two groups of pre-pits containing mutually different numbers of pre-pits along lines on both sides of the track, the pre-pits within each group of pre-pits being separated from each other by a first predetermined gap in the tracking direction of the optical recording medium, and the groups of pre-pits being separated from each other by a second predetermined gap in the tracking direction of the optical recording medium.

7. An optical recording and reproducing system for an optical recording medium having lines of pre-pits disposed in a tracking direction of the optical recording medium and wherein an optical spot is radiated onto the optical recording medium to effect recording and reproduction of information using information pits on the optical recording medium formed by localized changes in a characteristic of the optical recording medium, the information being recorded and reproduced using the lines of pre-pits as a guide for tracking control, the system comprising:

means for producing a light beam; and a condensing lens for condensing the light beam and for radiating the condensed light beam as an optical spot onto the optical recording medium;

wherein the information pits are disposed in the tracking direction of the optical recording medium along adjacent tracks, and wherein the adjacent tracks are separated from each other by a predetermined gap P defined by the following formula:

$$P = \lambda/2NA$$

where $\lambda$ is the wavelength of the light beam and NA is the numeric aperture of the condensing lens.

8. An optical recording and reproducing system according to claim 7, wherein the lines of pre-pits are separated from each other by a predetermined gap, and further comprising:

means for sampling the lines of pre-pits to obtain tracking error signals; and means for performing tracking control in effecting recording and reproduction of information on the optical recording medium in response to the tracking error signals.

9. An optical recording and reproducing apparatus according to claim 7, further comprising means for detecting a light intensity distribution of the radiated optical spot after impingement on the optical recording medium and indicative of the localized changes in the characteristic of the optical recording medium, the detecting means including a detector having a detecting surface on which the radiated optical spot after impingement on the optical recording medium is incident, the detecting surface being divided into first, second, and third detecting areas disposed in a direction of the detecting surface corresponding to a direction transverse to the tracking direction of the optical recording medium, the second detecting area being disposed between the first and third detecting areas, at least the first and third detecting areas providing outputs indicative of the light intensity distribution thereon, wherein the first and third detecting areas each have a dimension in the direction of the detecting surface corresponding to the transverse direction of the optical recording medium which is equal to 25% of a dimension of the detecting surface in the direction of the detecting surface corresponding to the transverse direction of the optical recording medium.

10. An optical recording and reproducing system according to any one of claim 7-9, wherein the characteristic of the optical recording medium having localized changes is a real amplitude reflection coefficient of the optical recording medium.

11. An optical recording and reproducing system according to claim 7, wherein the lines of pre-pits are provided with a discrimination pattern, and further comprising:

means for discriminating the pre-pits form the information pits on the basis of the discrimination pattern; and means for performing tracking and timing control in effecting recording and reproduction of information on the optical recording medium in response to the pre-pits discriminated by the discriminating means.

12. An optical recording and reproducing system according to claim 11, wherein the lines of pre-pits are provided with the discrimination pattern by alternately and repeatedly disposing two groups of pre-pits containing mutually different numbers of pre-pits along lines on both sides of the adjacent tracks, the pre-pits within each group of pre-pits being separated from each other by a first predetermined gap in the tracking direction of the optical recording medium, and the groups of pre-pits being separated from each other by a second predetermined gap in the tracking direction of the optical recording medium.

* * * * *